2,864,704

PRODUCTION OF SWISS CHEESE

Fred Feutz, Jr., Monroe, Wis., and Arthur B. Erekson, Lafayette, Calif., assignors to The Borden Company, New York, N. Y., a corporation of New Jersey No Drawing. Application October 4, 1954
Serial No. 460,256

7 Claims. (Cl. 99—116)

This invention relates to a new method of producing Swiss cheese, and more particularly to a method of producing truly rindless Swiss cheese having a more uniform distribution of salt throughout the cheese than has been possible heretofore.

In the conventional method of producing Swiss cheese, a batch of milk is prepared and placed in a suitable kettle or vat. Cultures and rennet are added to ripen the milk and to set the curd. The curd is then cut, worked, cooked and stirred until it develops the proper texture. At this stage the curd is dipped or separated from the whey either by using a dip cloth and a flexible steel hoop, or, in the case of larger batches, by pumping the curd and whey mixture over into a filter or molding tank. In either case the curd is then pressed, usually overnight, to allow the curd to knit firmly together in the shape of one solid block which may be cylindrical or rectangular in shape. The next morning the pressed curd is removed from the press, cut into smaller blocks if desired, and then placed in a saturated brine solution held at a temperature of around 50–55° F. The curd is salted in this brine solution for a period of from 1 to 4 days. At the end of this time, the salted block of curd is put on a shelf to drain, and stored in a cool room for a period that may range from several days to two weeks. During this time the brined curd may, if desired, be wrapped in some kind of a film, with or without preliminary waxing, and placed in a suitable box, or the brined curd may be simply stored on the shelf without any wrapping or box. The last operation is to cure the cheese, which is done by transferring it, either wrapped and boxed or without any wrapper and box, to a warm room maintained at a temperature of about 68 to 74° F. During this period in the warm curing room, the propionic bacteria in the curd multiply vigorously and generate large amounts of carbon dioxide which form gas pockets inside the cheese known as the "eyes." During curing Swiss cheese expands in volume about 15 to 20%, and regardless of whether it is wrapped and boxed, or merely cured on the shelf with periodic scrubbing and turning, the cheese bulges and develops a more rounded shape.

When the cheese is cured on the shelf by the conventional wheel process, a tough rind is gradually developed on the outer surface of the cheese. Various methods have been used for wrapping the curd after removal from the brine tank in an attempt to reduce or eliminate this tough rind. However, no method has been found heretofore which produces a surface exactly like the interior portions of the cheese or which prevents mold growth on the surface of the cheese during and after curing. Swiss cheese which has been brine salted has to be scraped and trimmed after it is cured before it is cut into smaller pieces for distribution to retail channels.

It is a principal object of this invention to enable the production of Swiss cheese having an outer surface which is truly free from mold, yeasts and other contamination, and that is just as soft and tastes the same as the interior portions of the cheese.

Another object of this invention is to produce such cheese in rectangular blocks which are extremely uniform and regular in shape, free from the undesirable bulges produced during ordinary curing and which have a uniform texture and salt distribution throughout the cheese with uniform eye formation throughout the cheese right out to its outer surfaces.

A further object of the invention is to make possible the elimination of the undesirable brine tanks formerly used for salting Swiss cheese, and at the same time to make it possible to wrap the curd prior to curing while the outer portion of the curd is still moist, warm and flexible.

In accordance with our invention the milk is prepared, placed in a kettle or vat, the curd is set, cut, cooked and stirred in the conventional manner. Shortly before the curd is ready to be dipped, a substantial portion of the whey is drawn off and common salt (sodium chloride) is added to the curd and remaining portion of the whey, preferably with stirring to obtain uniform distribution of the salt. Stirring is continued until the curd has the right grip showing that it is ready to be dipped or separated from the balance of the whey. The curd is then separated from the remaining whey, put under pressure and pressed overnight in the usual manner. The next morning when the curd, which is still warm, is removed from the press, it may if desired, be cut into blocks or smaller pieces. The curd blocks if cut from larger blocks are preferably wrapped in a heavy absorbent cloth to dry and smooth the freshly cut surfaces and may be placed in boxes to hold the blocks in shape. If the curd is so warm when removed from the press that it cannot be handled easily for wrapping, it is desirable to place it in a cold room for a short time until it becomes firm enough to handle. Ordinarily, this is accomplished in about one to three hours. The curd blocks are then wrapped in a moisture-proof material of some kind before the curd is completely cooled down and has become too firm or hard. The wrapped curd is then placed in curing boxes, held in a cold cellar for a period of days up to a total of around 2 weeks and then the wrapped curd, still in boxes, is placed in the warm room and cured at the usual temperatures.

If desired, the curd after removal from the press may be placed in cold saturated brine solution for a short time, preferably for less than 24 hours, although we have had excellent results using our process and eliminating entirely the brine salting of the curd.

When Swiss cheese curd is placed in saturated brine for the usual period of one to four days, the salt works its way into the curd through the outer surfaces by diffusion and forms a high concentration of salt in the outer portion of the curd extending in from ½ to ¾ of an inch. At the same time the saturated brine solution extracts moisture from the outer surface of the curd with the result that the blocks of curd, when they are removed from the brine tank have a very hard, horny outer skin which is high in salt and partially dehydrated compared with the interior of the cheese. The curd is also cooled down during this time to the temperature of the brine tank, usually in the range of 50–55° F., with the result that the cold, heavily salted, partially dehydrated outer layer of curd cannot be subjected to pressure or shaping without producing cracks, mechanical openings or other defects in the final cheese. Thus, any irregularities of shape, which frequently are caused during handling and brining of the curd blocks, are made permanent by the brining operation. The curd with its hard irregular outer surface at this stage is very difficult to wrap without entrapping substantial amounts of air, and it is extremely difficult to get a good tight cling of any kind of wrapper to the cheese. Waxing methods which have been proposed heretofore are not satisfactory for this purpose because no wax has yet been found which is adequate in other ways but is still flexible enough to withstand the subsequent expansion of the cheese during curing without checking and cracking.

Another disadvantage of the brining of Swiss cheese in a saturated brine solution is that the surface of the curd becomes more or less contaminated with yeasts and molds by reason of its exposure in the brine tank. A freshly prepared saturated brine solution leaches out too much of the milk sugar and other water soluble materials from the curd so that it has always been the practice of Swiss cheesemakers to use the brine solution over and over again, and this brine solution is not only saturated with salt and other soluble cheese compounds but also contains undesirable virulent strains of yeasts, molds and bacteria.

As a result the production of so-called rindless Swiss cheese made by wrapping the curd after it is removed from the brine tank does not prevent the growth of molds and yeasts on the surface of the cheese and leaves much to be desired, so far as the regularity of the shape of the final cheese is concerned.

These disadvantages of brine salting have been recognized in the industry for many years and attempts have been made from time to time to produce Swiss cheese by adding salt to the milk or to the curd and whey and eliminate the salting of the pressed curd in saturated brine. None of these attempts, so far as we are aware, has ever been successful at all.

We have found that brine salting of Swiss cheese can be eliminated, provided the amount of salt added to the curd and whey is regulated, and provided the curd after pressing is handled properly and cooled promptly to arrest bacterial actions until the cheese is ready to be placed in the warm room and cured. Our method also has the great advantage of permitting the wrapping of the curd while it is still moist, warm and pliable on its surfaces and thus a much better wrapping job is possible with less effort, and the shape of the final cured cheese may be controlled more exactly with the elimination of many irregularities that would otherwise have to be trimmed off when the cheese is cut for retail distribution. Also, in our method the salt is uniformly distributed throughout the cheese during and after curing. The reproduction of propionic bacteria during curing is affected by the amount of salt in the curd so that a uniform salt distribution throughout each block produces more uniform eye formation than can be obtained with brine salted curd in which the salt is still concentrated in the outer layers of curd at the time of curing.

The following is an example which is given as illustrative of one method of producing rindless Swiss cheese in accordance with our invention.

*Example I.*—The milk may be prepared in the usual manner by clarifying and separating out part of the fat as cream if necessary. If desired, the milk may be pasteurized. The prepared milk is then placed in either a round bottom conventional Swiss cheese kettle or in an oblong or rectangular make vat as desired. Cultures are added to the milk and, after a suitable interval, rennet is also added to set the curd. We have found that in making cheese according to our method it is important to exercise very careful control over the addition of cultures so that the right proportion of the different kinds of bacteria will be present in each batch. The use of standardized frozen cultures of the kind described in Erekson application Serial No. 455,083, filed September 9, 1954, is very desirable although not essential for this purpose.

After the curd has reached the proper set as determined by the cheesemaker, it may be cut in the usual manner with a harp, stirred and heated to the cooking temperature, usually in the range of about 120 to 128° F. We have found that 124° F. is a very suitable temperature for the cooking operation.

Shortly before the curd is ready to be dipped, for example, 10 to 20 minutes before the curd is ready to be separated from the whey, the stirring is stopped, allowing the curd to settle in the kettle or make vat, and a portion of the whey is then drawn off. The particular amount of whey drawn off at this stage is not vital, although it is desirable to drain or draw off enough whey so that the total batch is reduced to about one-half of the original volume of milk, or less. For example, if a batch of cheese is being made from 7000 pounds of milk, enough whey would be drawn off at this stage to reduce the batch to a total of about 2500 pounds of curd and whey. Enough whey should be retained to prevent matting of the curd. On the other hand, if too much whey is retained, extra salt has to be added which is not only wasted but winds up in the separated whey and may interfere with subsequent processing and disposal of the whey.

The stirring is then started up again and a suitable amount of salt is added to the curd and remaining whey while it is still in the kettle or make vat. The salt may be added in the form of a concentrated solution, a slurry or as dry salt. Stirring of the batch is continued after the salt addition until the curd shows the right grip to indicate that it is ready to be dipped or separated from the balance of the whey. At this stage the curd is either dipped out of a kettle using the conventional flexible steel hoop and dip cloth, or it may be pumped over into a filter or molding tank of the type described in United States Patent No. 2,494,637.

Starting with a batch of 7000 lbs. of milk and drawing off about 4500 lbs. of whey, we have found that anywhere from 3 lbs. to 35 lbs. of salt may be added to the curd and remaining whey to give a cured cheese containing an average amount of from 0.1 to 0.6% of salt uniformly distributed throughout the cheese. The addition of 14 lbs. of salt to such a batch produced Swiss cheese containing an average salt content of 0.25%, or in other words a total amount of salt equal to that obtained from 24 hours in the brine tank, but evenly distributed throughout the cheese rather than being more concentrated in the outer portions than it is in the center. Somewhat larger amounts of salt up to 77 lbs. may be added to such a batch to give a cheese containing as much as 1.1% salt but with such larger amounts the eye development in the cheese may be adversely affected.

After the curd is dipped or otherwise separated from the remaining whey, it is pressed overnight at room temperature either on a conventional press table or in a molding vat. The next morning the cheese may be cut into blocks or pieces of other shape which are preferably wrapped immediately in some kind of heavy absorbent cloth, such as a sheet of heavy butcher muslin, or sheets of cellulose fibers known as Viscon or the like to dry and close up the cut surfaces. The warm soft curd wrapped in an absorbent layer of some kind is then preferably placed in a box and immediately put in a cold room for an hour or two.

We have found that when the wrapped curd blocks are placed in boxes it is desirable to use a tight fitting arrangement so that the curd will not slump out of shape. One suitable way of accomplishing this is to use a box that is a fraction of an inch longer and wider than the block of curd. The cut block of curd wrapped in muslin or the like is then easily placed in such a box without damage, and the box may be first stood on end until the cheese slides down into the lower end. A board of the right thickness is then inserted between the upper end of the curd and the box, and the box is turned over on its side and the process repeated so that the curd is wedged firmly into the box.

If the curd is not cut upon being removed from the press, it does not need to be wrapped in cloth. Unless the curd is to warm and soft to handle, it may be wrapped immediately in a moisture-proof curing wrapper of some kind. It is often desirable, however, to cool the curd blocks to some extent before wrapping them in the curing wrapper so that the curd blocks will be somewhat firmer and easier to handle.

In any event, it is very desirable although not essential to wrap the curd in its curing wrapper within a day or two after removal from the press, before it is cooled down too much and while it is still in a more or less soft, warm, moist condition. In the case of cut blocks, this may be accomplished by first removing the curd from the first box and removing the layer of muslin or other absorbent material. The curd may then be wrapped in one or more sheets of a suitable film, such as Pliofilm, Vinylite, Saran, Parakote or the like, or it may be placed in a moisture impervious bag and a vacuum drawn in the bag to pull the bag down tightly against the sides of the cheese and the open end of the bag then sealed by heat or adhesives. Pliofilm is a rubber hydrochloride transparent sheet that is thin, flexible and resistant to moisture, oils etc. Vinylite sheets sold for food packaging are thin, flexible thermoplastic sheets made from a copolymer of vinyl acetate and vinyl chloride. Saran is a thin, flexible transparent sheet of a copolymer of vinylidene chloride and vinyl chloride. Parakote sheets commonly used for packaging cheese are composed of two sheets of cellophane laminated together and coated on one side with a grease resistant wax-rubber compound. Vinylite and Parakote sheets may be readily heat sealed at the overlaps and seams, but heat sealing is not necessary, and the seams may merely be tacked together with short strips of cellophane adhesive tape. If the wrapping material is to resistant to stretching, one or more pleats may be formed in the sheet to allow for expansion of the cheese during curing. Most of the wrapping methods which have been heretofore developed and used for producing rindless Cheddar or American cheese may be used to advantage in our process provided allowance is made for the expansion which occurs during the curing of Swiss cheese. Blocks of curd which are not cut may be similarly wrapped immediately after removal from the press or they may be put in a cold room for a short time such as 1 to 3 hours and then wrapped as above described.

The wrapped curd blocks may then be placed in ordinary wooden boxes and stored in a cold cellar for a period of time, such as a few days up to two weeks. In order to obtain the best results, so far as preserving a uniform and regular shape of the cheese is concerned, we prefer at this point to use floating lids in the top of the curing boxes arranged so that they slide down into the box and rest on the wrapped cheese with a portion of the lid extending up above the upper surface of the box. The boxes with these insert lids may thus be stacked one on top of another and weights may be placed on the uppermost box lid to keep the wrapped cheese under pressure. This not only has the advantage of preserving the shape of the cheese but also presses the wrapping sheet firmly against all surfaces of the curd and helps to remove any air which may have been entrapped at the time the blocks of curd were wrapped.

We have found that it is important to cool the cheese curd, either before or after wrapping, but reosonably promptly after it is removed from the press so that gas-forming fermentations will not start prematurely. The ordinary cold cellar in a Swiss cheese factory is frequently maintained at a temperature of around 50–55° F. and we have found that at least for the first day or two after the curd is removed from the press, it is desirable to place it in a cold cellar at a somewhat lower temperature such as 40–45° F. The interior of the block of curd is usually warmer than room temperature when removed from the press, and the interior of these blocks cools very slowly, particularly when the curd is wrapped and boxed. The curd may remain in the cold room at this same temperature throughout the holding period, or it may be transferred to a slightly warmer cold cellar after the first two or three days.

At the end of the holding period in the cold cellar, the wrapped cheese still in the boxes is transferred to the conventional curing room maintained at a temperature of around 68–74° F., and is held in this warm room until the cheesemaker has determined that the cheese is fully opened and cured. This usually requires from about two to five weeks. We have found it is desirable and that better shape cheese is obtained during curing if the insert pressure lids are removed from the curing boxes when the cheese is placed in the warm room to cure. Very little turning is required under these conditions, usually not more than once during the period the cheese is in the warm room. This may be accomplished by dumping out the wrapped block of partially cured cheese, turning is over and simply placing it back in the curing box.

At the end of the curing operation in the warm room, the cheese is transferred, still in the boxes, to a conventional cellar where it may be stored for any desired length of time to age.

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

It is claimed:

1. A process of producing Swiss cheese which comprises setting, cutting and cooking the curd, drawing off a substantial portion of whey immediately before the curd is dipped, adding common salt to the curd and remaining whey, separating and pressing the curd, enclosing the pressed curd in a film of moisture-proof material pressed firmly against the soft surfaces of the curd, holding the enclosed cheese in a cold room for a few days to about two weeks, and curing the cheese in a warm room.

2. A process of producing Swiss cheese which comprises adding common salt directly to the Swiss cheese curd and a portion of the whey, separating and pressing the curd, cooling and wrapping the curd promptly after removal from the press and while the surfaces of the curd are soft and pliable, the wrapping material being pressed firmly against the soft surfaces of the curd to exclude air and retard evaporation of moisture therefrom, holding the wrapped curd in a cold room for a period of days, and then curing the wrapped cheese in a warm room.

3. In a process of producing Swiss cheese having a soft edible surface, the steps of salting the curd with common salt in the make container before the curd is completely separated from the whey, separating and pressing the salted curd, cooling the curd promptly after removal from the press, wrapping the curd before it is completely cooled in a moisture-proof film without any substantial amount of entrapped air, holding the wrapped cheese in a cold room for a period of days, and curing the wrapped cheese in a warm room.

4. In a process of producing Swiss cheese having a soft edible surface, the steps of salting the curd with common salt in the make container before the curd is completely separated from the whey, separating and pressing the salted curd, cutting the pressed curd into blocks, removing excess moisture from the cut surfaces of the blocks and promptly cooling the blocks after removal from the press, then wrapping the blocks in a moisture-proof film to retain moisture in and exclude air from the curd surfaces, holding the wrapped cheese in a cold room for a period of days, and curing the wrapped cheese in a warm room.

5. In a process of producing Swiss cheese having a soft edible surface, the steps of salting the curd with common salt in the make container before the curd is completely separated from the whey, separating and pressing the salted curd, removing excess moisture from any cut surfaces of the curd and promptly cooling the curd after removal from the press, wrapping the curd while its surfaces are soft and warm in a moisture-proof film to retain moisture in and exclude air from the curd surfaces, placing the wrapped curd under pressure in curing boxes to preserve the shape of the cheese, and curing the wrapped and boxed cheese in a warm room.

6. A process of producing Swiss cheese which comprises setting, cutting and cooking the curd, drawing off a substantial portion of whey immediately before the curd is dipped, adding to the curd and remaining whey enough common salt to leave an average salt content of 0.1 to 1.1% in the curd after the remaining whey is separated, separating and pressing the salted curd, promptly cooling the curd after removal from the press and wrapping the curd in a moisture-proof sheet material to retain moisture in and exclude air from the curd surfaces, placing the wrapped curd in a curing box, and curing the wrapped and boxed cheese in a warm room.

7. In a process of producing Swiss cheese having a soft edible surface, the steps of salting the curd with common salt in the make container before the curd is completely separated from the whey, separating and pressing the salted curd, promptly cooling the curd after removal from the press and wrapping the curd before it is fully cooled in a moisture-proof film to retain moisture in and exclude air from the curd surfaces, placing the wrapped curd in boxes under pressure in a cold room, and curing the wrapped and boxed cheese in a warm room.

References Cited in the file of this patent

UNITED STATES PATENTS

| | | | |
|---|---|---|---|
| Re. 23,489 | Toone | | Apr. 29, 1952 |
| 30,638 | McAllister | | Nov. 13, 1860 |
| 821,334 | Buskist et al. | | May 22, 1906 |
| 1,334,693 | Doane | | Mar. 23, 1920 |
| 2,291,632 | Jorgensen | | Aug. 4, 1942 |
| 2,494,636 | Stine | | Jan. 17, 1950 |
| 2,494,638 | Stine | | Jan. 17, 1950 |